(12) United States Patent
Tsai (10) Patent No.: US 9,273,720 B2
(45) Date of Patent: *Mar. 1, 2016

(54) FOLDABLE TABLE

(71) Applicant: Ping-Cheng Tsai, Shenzhen (CN)

(72) Inventor: Ping-Cheng Tsai, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 13/998,775

(22) Filed: Dec. 3, 2013

(65) Prior Publication Data

US 2014/0115827 A1    May 1, 2014

Related U.S. Application Data

(63) Continuation of application No. 13/694,182, filed on Nov. 1, 2012, now Pat. No. 8,677,912.

(51) Int. Cl.
| | | |
|---|---|---|
| *F16C 11/10* | (2006.01) | |
| *A47B 3/08* | (2006.01) | |
| *A47B 3/087* | (2006.01) | |
| *A47B 13/06* | (2006.01) | |
| *A47B 13/08* | (2006.01) | |
| *A47B 3/00* | (2006.01) | |

(52) U.S. Cl.
CPC .................. *F16C 11/10* (2013.01); *A47B 3/087* (2013.01); *A47B 3/0818* (2013.01); *A47B 13/06* (2013.01); *A47B 13/083* (2013.01); *A47B 2003/008* (2013.01); *Y10T 16/5406* (2015.01)

(58) Field of Classification Search
CPC .............. Y10T 16/5406; Y10T 16/544; Y10T 16/5445; E05D 3/18; E05D 11/06; E05D 11/1007; E05Y 2900/20; F16C 11/10; A47B 3/0818; A47B 3/087; A47B 13/06; A47B 13/083; A47B 2003/008

USPC .................... 16/348, 357, 360; 108/129, 132, 108/171–174, 115, 35, 36, 167–169; 248/188.6, 439

See application file for complete search history.

(56) References Cited

U.S. PATENT DOCUMENTS

| | | | | |
|---|---|---|---|---|
| 3,799,073 | A * | 3/1974 | Nielsen .......................... | 108/169 |
| 6,058,853 | A * | 5/2000 | Pinch ............................ | 108/129 |
| 7,278,361 | B2 * | 10/2007 | Zhurong et al. .............. | 108/168 |
| 7,475,641 | B2 * | 1/2009 | Jin ................................. | 108/132 |
| 7,634,969 | B2 * | 12/2009 | Neunzert et al. ............. | 108/132 |
| 7,640,870 | B2 * | 1/2010 | Strong et al. ................. | 108/132 |
| 8,225,725 | B2 * | 7/2012 | Voris ............................. | 108/132 |
| 8,261,676 | B2 * | 9/2012 | VanNimwegen et al. ..... | 108/125 |
| 2002/0092445 | A1 * | 7/2002 | Glover et al. ................. | 108/129 |
| 2005/0061214 | A1 * | 3/2005 | Tsai ............................... | 108/132 |
| 2005/0155534 | A1 * | 7/2005 | Lin et al. ....................... | 108/132 |
| 2008/0216719 | A1 * | 9/2008 | Larcom et al. ................ | 108/132 |
| 2011/0017109 | A1 * | 1/2011 | Stanford ....................... | 108/132 |
| 2014/0116301 | A1 * | 5/2014 | Tsai ............................... | 108/169 |
| 2014/0116302 | A1 * | 5/2014 | Tsai ............................... | 108/169 |

* cited by examiner

*Primary Examiner* — William Miller
(74) *Attorney, Agent, or Firm* — Raymond Y. Chan; David and Raymond Patent Firm (57) ABSTRACT

A foldable table includes a first tabletop panel, a second tabletop panel, a first peripheral edge rim, a second peripheral edge rim, and a foldable frame. The foldable frame includes a reinforcing frame which includes first through fourth elongated reinforcing member spacedly mounted along two longitudinal sides of the first receiving cavity and the second receiving cavity respectively, a first and a second leg frame pivotally mounted on the first receiving cavity and the second receiving cavity respectively, and a hinge arrangement. The hinge arrangement includes a first connecting joint, a second connecting joint, and a first and a second locker device coupled to the first connecting joint and the second connecting joint respectively, wherein the first locker device and the second locker device are arranged to operate between a locked position and an unlock position.

20 Claims, 7 Drawing Sheets

FOLDABLE TABLE

CROSS REFERENCE OF RELATED APPLICATION

This is a Continuation application that claims the benefit of priority under 35 U.S.C. §119 to a non-provisional application, application Ser. No. 13/694,182, filed Oct. 1, 2012.

BACKGROUND OF THE PRESENT INVENTION

1. Field of Invention

The present invention relates to a table; and more particularly to a foldable table which is equipped with a reinforcing frame for substantially strengthening a structural integrity of the foldable table, and a hinge arrangement for selectively and conveniently folding and unfolding a tabletop of the foldable table.

2. Description of Related Arts

A conventional foldable table usually comprises a tabletop and a supporting frame which comprises a tabletop reinforcing frame and a foldable leg frame connected thereunder in a pivotally foldable manner. When the foldable table is in use, the leg frame is pivotally unfolded and extended to support the tabletop at an elevated height, and when the foldable table is not in use, the leg frame is capable of being folded towards the tabletop for reduction in its overall size so as to facilitate easy storage and transportation.

Conventionally, most of the improvements for conventional foldable tables have been overwhelmingly concentrated on the leg frame. Persons skill in the art have devoted themselves in developing new kinds of leg frames and the foldable mechanism in order to make the foldable table easier to fold, more compact in size and more secure in structure.

On the other hand, however, it has been recognized that the tabletop may also be designed to reduce an overall size of the foldable table (e.g. by making the tabletop foldable). Although it is conceived that by altering the structure of the tabletop, the overall stability and security of the foldable table may be substantially deteriorated, this disadvantage should be carefully tackled so as to develop an optimal foldable table which is both compact in size and secure in structure.

SUMMARY OF THE PRESENT INVENTION

The invention is advantageous in that it provides a foldable table which is equipped with a reinforcing frame for substantially strengthening a structural integrity of the foldable table, and a hinge arrangement for selectively and conveniently folding and unfolding a tabletop of the foldable table.

Another advantage of the invention is to provide a foldable table which comprises a foldable frame which is capable of supporting a tabletop in a foldably movable manner without affecting the stability of the foldable table.

Another advantage of the invention is to provide a foldable table which comprises a hinge arrangement comprising a pivot pin pivotally connecting a two connecting joints for facilitating folding motions between two tabletop panels.

Another advantage of the invention is to provide a foldable table comprising a foldable frame which does not involve complicated and expensive mechanical components and processes so that the manufacturing cost of the present invention can be minimized.

Additional advantages and features of the invention will become apparent from the description which follows, and may be realized by means of the instrumentalities and combinations particular point out in the appended claims.

According to the present invention, the foregoing and other objects and advantages are attained by providing a foldable table, comprising:

a tabletop, which comprises:

a first tabletop panel;

a second tabletop panel;

a first peripheral edge rim downwardly and peripherally extended from the first tabletop panel to define a first receiving cavity within a bottom surface of the first tabletop panel and the first peripheral edge rim; and a second peripheral edge rim downwardly and peripherally extended from the second tabletop panel to define a second receiving cavity within a bottom surface of the second tabletop panel and the second peripheral edge rim; and a foldable frame, which comprises:

a reinforcing frame which comprises first through fourth elongated reinforcing member spacedly mounted along two longitudinal sides of the first receiving cavity and the second receiving cavity respectively;

a first and a second leg frame pivotally mounted on the first receiving cavity and the second receiving cavity respectively; and a hinge arrangement, which comprises:

a first connecting joint provided between inner ends of the first and third elongated reinforcing member respectively for allowing the first elongated reinforcing member and the third elongated reinforcing member to pivotally fold and unfold with respect to each other;

a second connecting joint provided between inner ends of the second and fourth elongated reinforcing member respectively for allowing the second elongated reinforcing member and the fourth elongated reinforcing member to pivotally fold and unfold with respect to each other; and a first and a second locker device coupled to the first connecting joint and the second connecting joint respectively, wherein the first locker device and the second locker device are arranged to operate between a locked position and an unlock position, wherein in the locked position, the first locker device and the second locker device are arranged to lock up pivotal movements of the first connecting joint and the second connecting joint, wherein in the unlocked position, the first locker device and the second locker device are arranged to unlock the pivotal movements of the first connecting joint and the second connecting joint so as to allow the first tabletop panel to fold and unfold with respect to the second tabletop panel.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1 to FIG. 7 of the drawings, a foldable table according to a preferred embodiment of the present invention is illustrated, in which the foldable table comprises a tabletop 10, and a foldable frame 20.

The tabletop 10 comprises a first tabletop panel 11, a second tabletop panel 12, a first peripheral edge rim 13 and a second peripheral edge rim 14. On the other hand, the foldable frame 20 comprises a reinforcing frame 21, a first leg frame 22, a second leg frame 23 and a hinge arrangement 24.

The first peripheral edge rim 13 is downwardly and integrally extended from the first tabletop panel 11 to define a first receiving cavity 111 within a bottom surface 112 of the first tabletop panel 11 and the first peripheral edge rim 13.

The second peripheral edge rim 14 is downwardly and integrally extended from the second tabletop panel 12 to define a second receiving cavity 121 within a bottom surface 122 of the second tabletop panel 12 and the second peripheral edge rim 14.

The reinforcing frame 21 comprises first through fourth elongated reinforcing member 211, 212, 213, 214 spacedly mounted along two longitudinal sides of the first receiving cavity 111 and the second receiving cavity 121 respectively.

The first and the second leg frame 22, 23 are pivotally mounted on the first receiving cavity 111 and the second receiving cavity 121 respectively. On the other hand, the hinge arrangement 24 comprises a first connecting joint 241, a second connecting joint 242, a first locker device 243, and a second locker device 244.

The first connecting joint 241 is provided between inner ends of the first and third elongated reinforcing member 211, 213 respectively for allowing the first elongated reinforcing member 211 and the third elongated reinforcing member 213 to pivotally fold and unfold with respect to each other.

Moreover, the second connecting joint 242 is provided between inner ends of the second and fourth elongated reinforcing member 212, 214 respectively for allowing the second elongated reinforcing member 212 and the fourth elongated reinforcing member 214 to pivotally fold and unfold with respect to each other.

On the other hand, the first and a second locker device 243, 244 are coupled to the first connecting joint 241 and the second connecting joint 242 respectively, wherein the first locker device 243 and the second locker device 244 are arranged to operate between a locked position and an unlock position, wherein in the locked position, the first locker device 243 and the second locker device 244 are arranged to lock up pivotal movements of the first connecting joint 241 and the second connecting joint 242, wherein in the unlocked position, the first locker device 243 and the second locker device 244 are arranged to unlock the pivotal movements of the first connecting joint 241 and the second connecting joint 242 so as to allow the first tabletop panel 11 to fold and unfold with respect to the second tabletop panel 12.

According to the preferred embodiment of the present invention, the first tabletop panel 11 and the second tabletop panel 12 are made of plastic material and are preferably formed by injection molding. Other manufacturing method is feasible but injection molding is the preferred mode of manufacturing method of the present invention. Moreover, each of the first tabletop panel 11 and the second tabletop panel 12 is rectangular in cross-sectional shape so that when they are foldably connected by the foldable frame 20, the entire foldable table has a rectangular cross sectional shape as well.

The first peripheral edge rim 13 and the second peripheral edge rim 14 are integrally extended from the first tabletop panel 11 and the second tabletop panel 12 respectively for forming the first receiving cavity 111 and the second receiving cavity 121. In this preferred embodiment, each of the first peripheral edge rim 13 and the second peripheral edge rim 14 is extended from a corresponding outer transverse edge and two longitudinal edges of the first tabletop panel 11 and the second tabletop panel 12 respectively. In other words, each of the first peripheral edge rim 13 and the second peripheral edge rim 14 form a U-shaped cross section with viewed from the bottom side of the foldable table.

Thus, the first peripheral rim 13 has a first transversely extending portion 131 and two first longitudinally extending portion 132, while second peripheral rim 14 has a second transversely extending portion 141 and two second longitudinally extending portion 142.

The first and the second elongated reinforcing member 211, 212 are extended along first longitudinally extending portions 132 of the first peripheral rim 13 respectively, while the third and the fourth elongated reinforcing member 213, 214 are extended along the longitudinally extending portions 142 of the second peripheral edge rim 14.

On the other hand, the first leg frame 22 comprises a first supporting leg 221 having two first leg members 2211 pivotally connected to the first and the second elongated reinforcing member 211, 212, and a first connecting frame 222 foldably connected between the first tabletop panel 11 and the first supporting leg 221 in such a manner that the first supporting leg 221 is capable of selectively and pivotally folding toward and unfolding from the first tabletop panel 11 through the first connecting frame 222.

Similarly, the second leg frame 23 comprises a second supporting leg 231 having two second leg members 2311 pivotally connected to the third and the fourth elongated reinforcing member 213, 214, and a second connecting frame 232 foldably connected between the second tabletop panel 12 and the second supporting leg 231 in such a manner that the second supporting leg 231 is capable of selectively and pivotally folding toward and unfolding from the second tabletop panel 12 through the second connecting frame 232.

Figure 1:
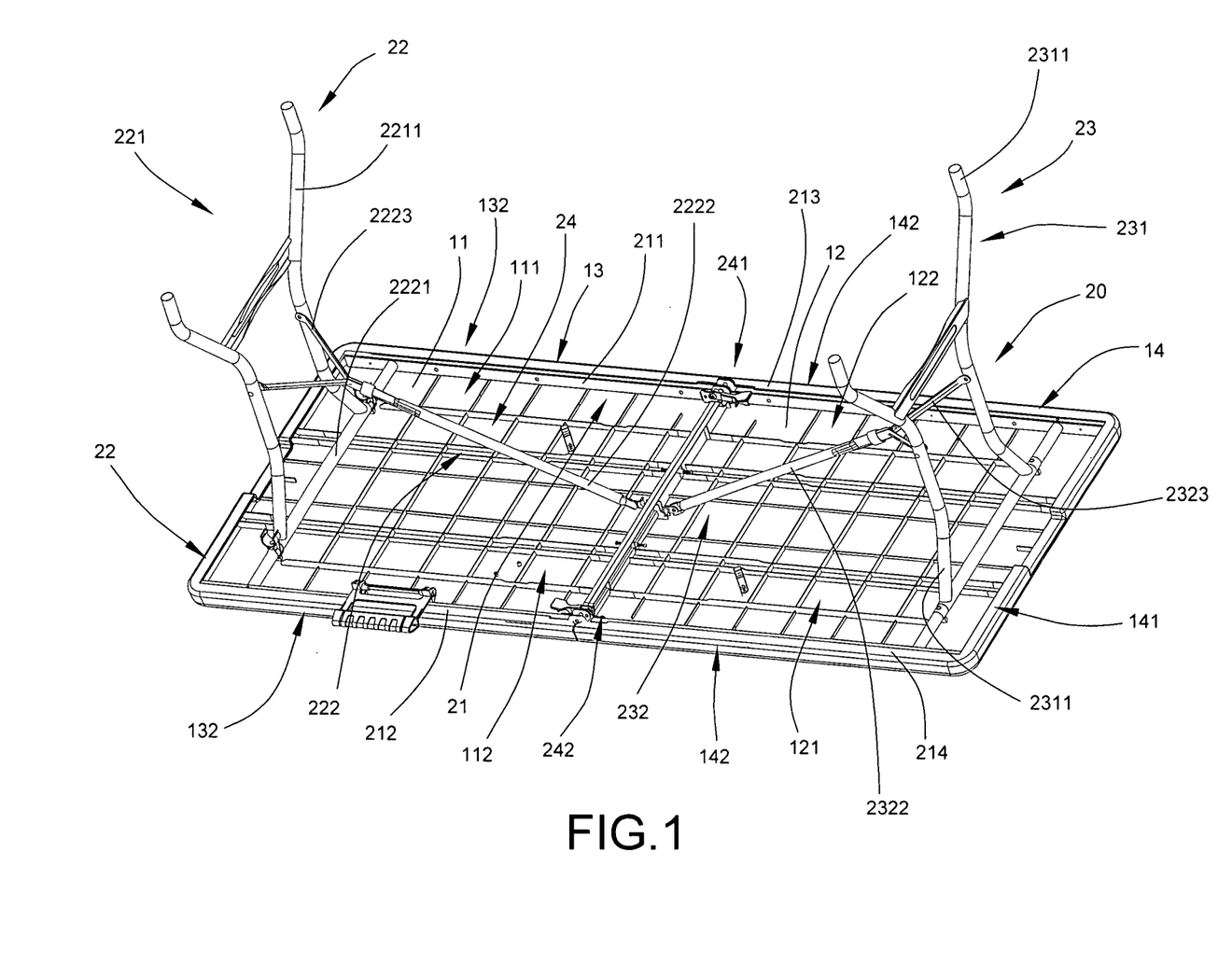
FIG. 1 is a perspective view of a foldable table according to a preferred embodiment of the present invention.

More specifically, the first connecting frame 222 comprises a first folding rod 2221 transversely extended between two inner end portions of the first reinforcing member 211 and the second reinforcing member 212 in the first receiving cavity 111, a first pivotal connecting shaft 2222 having one end pivotally extended from a mid portion of the first folding rod 2221, and a plurality of first elongated folding rods 2223 each having one end pivotally connected to the first leg members 2211 respectively, and another end pivotally coupled with another end of the first pivotal connecting shaft 2222. As shown in FIG. 1 of the drawings, when the elongated folding rods 2223 are pivotally folded with respect to the first pivotal connecting shaft 2222, the first supporting leg 221 is capable of folding and unfolding toward the first tabletop panel 11.

The second connecting frame 232 comprises a second folding rod 2321 transversely extended between two inner end portions of the third reinforcing member 213 and the fourth reinforcing member 214 in the second receiving cavity 121, a second pivotal connecting shaft 2322 having one end pivotally extended from a mid portion of the second folding rod 2321, and a plurality of second elongated folding rods 2323 each having one end pivotally connected to the second leg members 2311 respectively, and another end pivotally coupled with another end of the second pivotal connecting shaft 2322. Also as shown in FIG. 1 of the drawings, when the elongated folding rods 2323 are pivotally folded with respect to the second pivotal connecting shaft 2322, the second supporting leg 231 is capable of folding and unfolding toward the second tabletop panel 12.

In other words, the first connecting frame 222 and the second connecting frame 232 are capable of facilitating folding and unfolding of the first leg frame 22 and the second leg frame 23. When the first leg frame 22 and the second leg frame 23 are folded toward the first and the second tabletop panel 11, 12, the entire foldable table can be reduced to a compact size.

Figure 4:
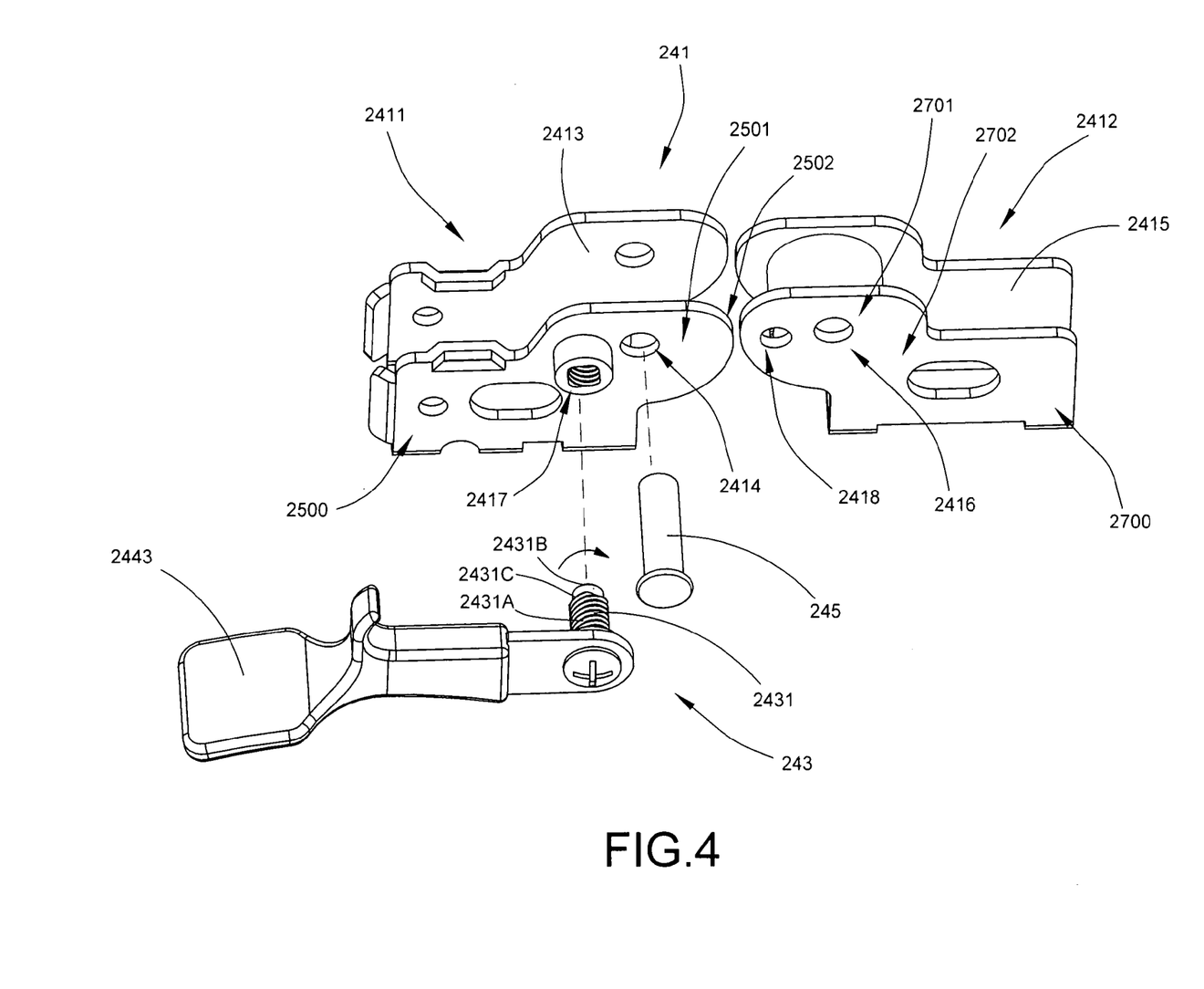
FIG. 4 is a perspective view of a connecting joint of the foldable table according to the above preferred embodiment of the present invention.
Figure 5:
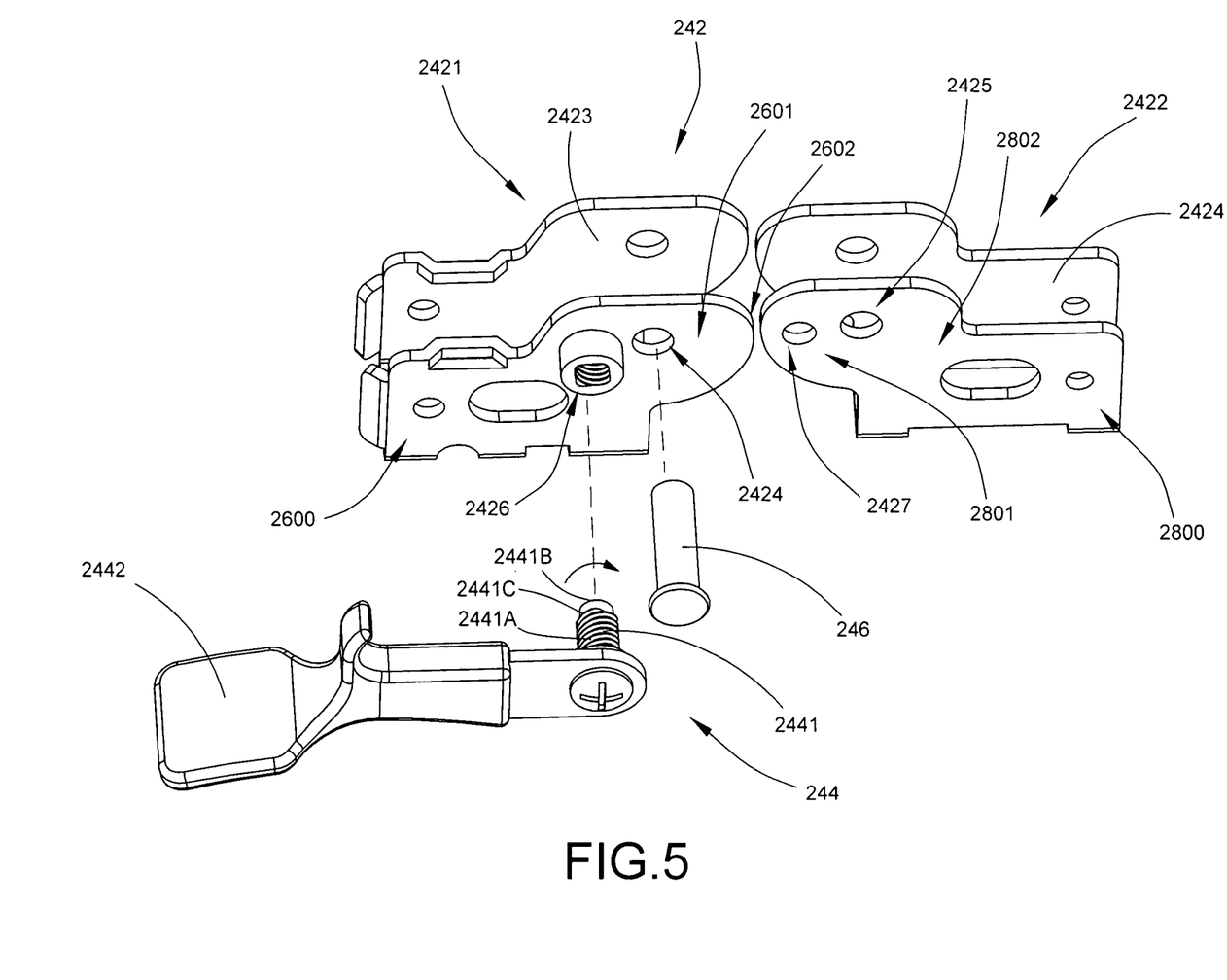
FIG. 5 is an exploded perspective view of the connecting joint of the foldable table according to the above preferred embodiment of the present invention.
Figure 6:
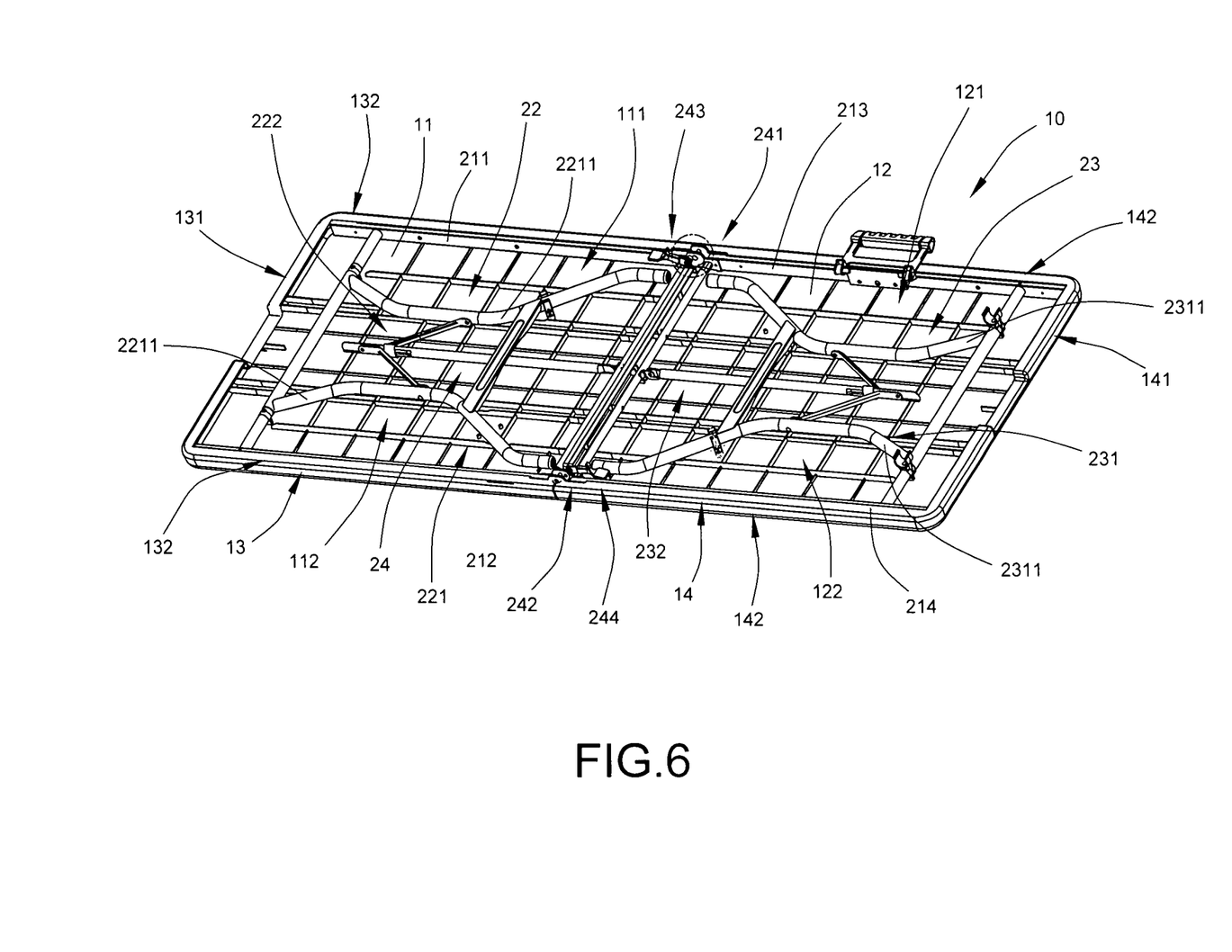
FIG. 6 is a perspective view of the foldable table according to the above preferred embodiment of the present invention, illustrating one of the locker devices.
Figure 7:
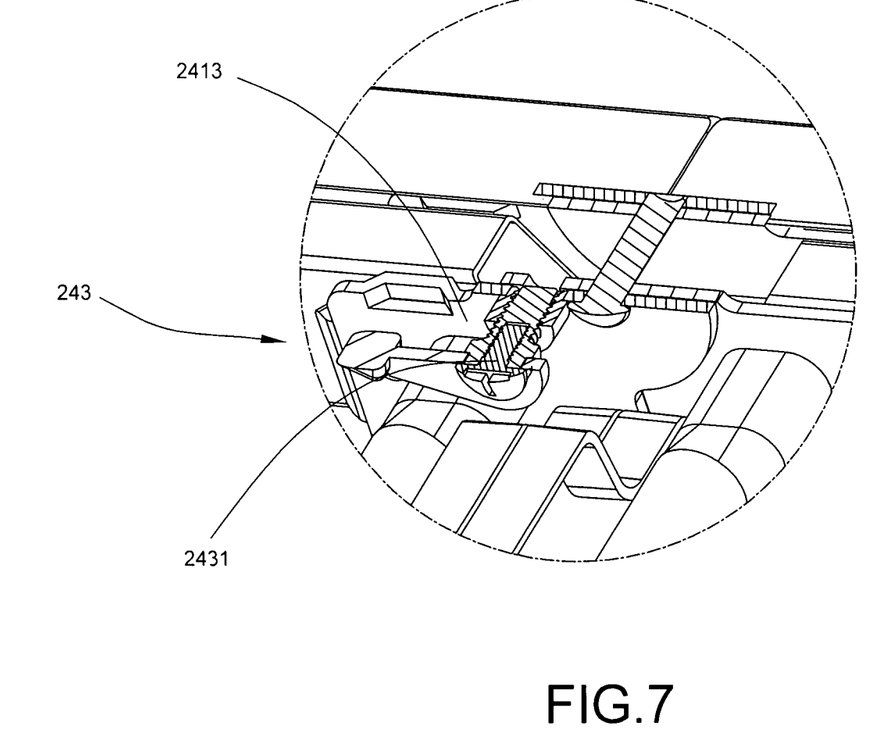
FIG. 7 is a schematic diagram of one of the locker devices according to the above preferred embodiment of the present invention.

Referring to FIG. 4 to FIG. 5 of the drawings, the hinge arrangement 24 comprises the first connecting joint 241, the second connecting joint 242, the first locker device 243, and the second locker device 244. According to the preferred embodiment of the present invention, the first connecting joint 241 comprises a first joint member 2411 and a third joint member 2412 coupled to the inner end of the first elongated reinforcing member 211 and the third elongated reinforcing member 213 respectively. The first joint member 2411 comprises a plurality of first connecting panels 2413 spacedly mounted to the first elongated reinforcing member 211, wherein each of the first connecting panels 2413 has a first pivot hole 2414 alignedly formed thereon. Moreover, the hinge arrangement 24 further comprises a first pivot pin 245 arranged to penetrate the first pivot holes 2414 formed on the first connecting panels 2413.

On the other hand, the third joint member 2412 is coupled to the inner end of the third elongated reinforcing member 213. The third joint member 2412 comprises a plurality of third connecting panels 2415 spacedly mounted to the third elongated reinforcing member 213, wherein each of the third connecting panels 2415 has a third pivot hole 2416 alignedly formed thereon. As shown in FIG. 4 of the drawings, the first connecting panels 2413 are arranged to overlap with the third connecting panels 2415 at the space formed between the first connecting panels 2413 and the third connecting panels 2415, wherein the first pivot pin 245 is arranged to penetrate the first pivot holes 2414 and the third pivot holes 2416 so that the first joint member 2411 and the third joint member 2413 can be pivotally folded and unfolded with respect to each other.

Similarly, as shown in FIG. 5 of the drawings, the second connecting joint 242 comprises a second joint member 2421 and a fourth joint member 2422 coupled to the inner end of the second elongated reinforcing member 212 and the fourth elongated reinforcing member 214 respectively. The second joint member 2421 comprises a plurality of second connecting panels 2423 spacedly mounted to the second elongated reinforcing member 212, wherein each of the second connecting panels 2423 has a second pivot hole 2424 alignedly formed thereon. Moreover, the hinge arrangement 24 further comprises a second pivot pin 246 arranged to penetrate the second pivot holes 2424 formed on the second connecting panels 2423.

On the other hand, the fourth joint member 2422 is coupled to the inner end of the fourth elongated reinforcing member 214. The fourth joint member 2422 comprises a plurality of fourth connecting panels 2424 spacedly mounted to the fourth elongated reinforcing member 214, wherein each of the fourth connecting panels 2422 has a fourth pivot hole 2425 alignedly formed thereon. As shown in FIG. 5 of the drawings, the second connecting panels 2423 are arranged to overlap with the fourth connecting panels 2424 at the space formed between the second connecting panels 2423 and the fourth connecting panels 2422, wherein the second pivot pin 246 is arranged to penetrate the second pivot holes 2424 and the fourth pivot holes 2425 so that the second joint member 2421 and the fourth joint member 2422 can be pivotally folded and unfolded with respect to each other.

It is worth mentioning that the first pivot pin 245 and the second pivot pin 246 are rigid and may be embodied as having a wide variety of cross sectional shapes so as to ensure sound stability of the hinge arrangement 24. Moreover, the first pivot pin 245 and the second pivot pin 246 can be made of a wide variety of materials so as to accommodate different manufacturing and marketing needs.

Each of the first connecting panels 2413 has a first base portion 2500 coupled to the first elongated reinforcing member 211 and a first head portion 2501 upwardly and inwardly extended from the first base portion 2500, wherein the first pivot hole 2414 is formed on the first head portion 2501. Similarly, each of the third connecting panels 2415 has a third base portion 2700 coupled to the third elongated reinforcing member 213 and a third head portion 2701 upwardly and inwardly extended from the third base portion 2500, wherein the third pivot hole 2416 is formed on the third head portion 2701.

Each of the second connecting panels 2423 has a second base portion 2600 coupled to the second elongated reinforcing member 212 and a second head portion 2601 upwardly and inwardly extended from the second base portion 2600, wherein the second pivot hole 2424 is formed on the second head portion 2601. Finally, each of the fourth connecting panels 2424 has a fourth base portion 2800 coupled to the fourth elongated reinforcing member 214 and a fourth head portion 2801 upwardly and inwardly extended from the fourth base portion 2800, wherein the fourth pivot hole 2425 is formed on the fourth head portion 2801.

From the forgoing descriptions, it can be shown that the first tabletop panel 11 and the second tabletop panel 12 can be selectively folded and unfolded through hinge arrangement 24 of the foldable frame 20. Moreover, as mentioned earlier, the first leg frame 22 and the second leg frame 23 can also be folded and unfolded with respect to the first tabletop panel 11 and the second tabletop panel 12 respectively.

Referring to FIG. 4 to FIG. 7 of the drawings, the first locker device 243 comprises a first locker pin 2431 and a first locker handle 2432 extended from the first locker pin 2431, wherein the first locker pin 2431 is arranged to selectively penetrate one of the first connecting panels 2413 and the corresponding third connecting panel 2415 for restricting the relative pivotal movement between the corresponding first joint member 2411 and the third joint member 2412. Accordingly, the first joint member 2411 further has a first locker hole 2417 formed on one of the first connecting panels 2413 while the third joint member 2412 further has a third locker hole 2418 formed on the corresponding third connecting panel 2415, wherein the first locker hole 2417 and the third locker hole 2418 are aligned with each other so that the first locker pin 2431 is arranged to rotatably penetrate the first locker hole 2417 and the third locker hole 2418 for selectively locking the first joint member 2411 and the third joint member 2412. Note that the rotational movement of the first locker pin 2431 is actuated by a movement of the locker handle 2432.

Accordingly, the first locker hole 2417 and the third locker hole 2418 are two circular holes and are aligned with each other when the first and second tabletop panels 11, 12 are pivotally folded in the unfolded condition. In other words, when the first and second tabletop panels 11, 12 are pivotally folded in the folded condition, the first locker hole 2417 is misaligned with the third locker hole 2418. As shown in FIG. 4, the first locker pin 2431 has a first thread portion 2431A and a first free end portion 2431B having a diameter smaller than that of the first thread portion 2431A, and defines a first neck platform 2431C between the first thread portion 2431A and the first free end portion 2431B. The first thread portion 2431A of the first locker pin 2431 is rotatably coupled with the first locker hole 2417 which is a threaded hole. The length of the first thread portion of the first locker pin 2431 is longer than the length of the first locker hole 2417. The third locker hole 2418 has a diameter matching with the diameter of the first free end portion 2431B of the first locker pin 2431. In other words, the diameter of the first locker hole 2417 is larger than the diameter of the third locker hole 2418. When the first locker pin 2431 is rotated to rotatably engage with the first locker hole 2417, the first free end portion 2431B of the first locker pin 2431 is aligned to be inserted into the third locker hole 2418. Once the first free end portion 2431B of the first locker pin 2431 is inserted into the third locker hole 2418, the first joint member 2411 and the third joint member 2412 are locked up with each other. When the first locker pin 2431 is rotated at an opposed direction, the first free end portion 2431B of the first locker pin 2431 is disengaged with the third locker hole 2418, i.e. the first free end portion 2431B of the first locker pin 2431 is moved away from the third locker hole 2418. Therefore, the first joint member 2411 and the third joint member 2412 are unlocked to enable the pivotal movement between the first joint member 2411 and the third joint member 2412.

It is worth mentioning that the first connecting panels 2413 and the third connecting panels 2415 are parallel and overlapped with each other, wherein the first connecting panels 2413 and the third connecting panels 2415 are pivotally coupled via the first pivot pin 245. In particular, the first head portion 2501 of the first connecting panel 2413 is spacedly overlapped with the third head portion 2701 of the third connecting panel 2415 to define a clearance or gap therebetween, wherein the first head portion 2501 of the first connecting panel 2413 is pivotally coupled with the third head portion 2701 of the third connecting panel 2415 via the first pivot pin 245. In view of the first connecting joint 2411, the first pivot pin 245 is located between the first locker hole 2417 and a first free edge 2502. In view of the third connecting joint 2412, the first pivot pin 245 is located between the third locker hole 2418 and a third neck portion 2702 which is a portion between the third head portion 2701 and the third base portion 2700.

After the first free end portion 2431B of the first locker pin 2431 is inserted into the third locker hole 2418, the first locker pin 2431 is kept rotating until the first neck platform 2431C is biased against the corresponding third connecting panel 2415. As a result, a portion of the third connecting panel 2415, i.e. the third head portion 2701, around the third locker hole 2418 is pressed away from the corresponding first connecting panel 2413. Due to the pivot movement of the third connecting panel 2415 at the pivot point of the first pivot pin 245, an opposed portion of the third connecting panel 2415, i.e. the third neck portion 2702, is pivotally moved to press against the corresponding first connecting panel 2413 at the first free edge 2502 thereof. Therefore, a gap between the first and third connecting panels 2413, 2415 will be minimized. Accordingly, when the first connecting panels 2413 and the third connecting panels 2415 are parallel with each other, the gap will be formed between the first and third connecting panels 2413, 2415 without contacting with each other. When the loading force is applied on the tabletop 10, the loading force will be concentrated at the first pivot pin 245 which may damage the first pivot pin 245 and may cause the foldable table unstable. The foldable table will be wobbly due to the gap. When the gap between the first and third connecting panels 2413, 2415 is minimized, the first and third connecting panels 2413, 2415 will press with each other to enhance the rigidity of the reinforcing frame 21 especially to reinforce the connection between the inner ends of the first and third elongated reinforcing members 211, 213. Furthermore, when the loading force is applied on the tabletop 10, the loading force will be evenly distributed along the first and third elongated reinforcing member 211, 213 via the first and third connecting panels 2413, 2415, such that the foldable table will be stable to prevent any unwanted wobbling movement thereof. It is worth mentioning that the neck platform is biased against the corresponding third connecting panel 2415 to substantially retain the gap distance between the first and third connecting panels 2413, 2415 so as to prevent the unwanted relative movement between the first and third connecting panels 2413, 2415.

On the other hand, the second locker device 244 comprises a second locker pin 2441 and a second locker handle 2442 extended from the second locker pin 2441, wherein the second locker pin 2441 is arranged to selectively penetrate one of the second connecting panels 2423 and the corresponding fourth connecting panel 2424 for restricting the relative pivotal movement between the corresponding second joint member 2421 and the fourth joint member 2422. Accordingly, the second joint member 2421 further has a second locker hole 2426 formed on one of the second connecting panels 2423 while the fourth joint member 2422 further has a fourth locker hole 2427 formed on the corresponding fourth connecting panel 2424, wherein the second locker hole 2426 and the fourth locker hole 2427 are aligned with each other so that the second locker pin 2441 is arranged to rotatably penetrate the second locker hole 2426 and the fourth locker hole 2427 for selectively locking the second joint member 2421 and the fourth joint member 2422. Note that the rotational movement of the second locker pin 2441 is actuated by a movement of the second locker handle 2442.

Similarly, the second locker hole 2426 and the fourth locker hole 2427 are two circular holes and are aligned with each other when the first and second tabletop panels 11, 12 are pivotally folded in the unfolded condition. In other words, when the first and second tabletop panels 11, 12 are pivotally folded in the folded condition, the second locker hole 2426 is misaligned with the fourth locker hole 2427. As shown in FIG. 5, the second locker pin 2441 has a second thread portion 2441A and a second free end portion 2441B having a diameter smaller than that of the second thread portion 2441A, and defines a second neck platform 2441C between the second thread portion 2441A of the second free end portion 2441B. The second thread portion 2441A of the second locker pin 2441 is rotatably coupled with the second locker hole 2426 which is a threaded hole. The length of the second thread portion 2441A of the second locker pin 2441 is longer than the length of the second locker hole 2426. The fourth locker hole 2427 has a diameter matching with the diameter of the second free end portion 2441B of the second locker pin 2441. In other words, the diameter of the second locker hole 2426 is larger than the diameter of the fourth locker hole 2427. When the second locker pin 2441 is rotated to rotatably engage with the second locker hole 2426, the second free end portion 2441B of the second locker pin 2441 is aligned to be inserted into the fourth locker hole 2427. Once the free end portion 2441B of the second locker pin 2441 is inserted into the fourth locker hole 2427, the second joint member 2421 and the fourth joint member 2422 are locked up with each other. When the second locker pin 2441 is rotated at an opposed direction, the second free end portion 2441B of the second locker pin 2441 is disengaged with the fourth locker hole 2427, i.e. the second free end portion 2441B of the second locker pin 2441 is moved away from the fourth locker hole 2427. Therefore, the second joint member 2421 and the fourth joint member 2422 are unlocked to enable the pivotal movement between the second joint member 2421 and the fourth joint member 2422.

It is worth mentioning that the second connecting panels 2423 and the fourth connecting panels 2424 are parallel and overlapped with each other, wherein the second connecting panels 2423 and the fourth connecting panels 2424 are pivotally coupled via the second pivot pin 246. In particular, the second head portion 2601 of the second connecting panel 2423 is spacedly overlapped with the fourth head portion 2801 of the fourth connecting panel 2424 to define a clearance or gap therebetween, wherein the second head portion 2601 of the second connecting panel 2423 is pivotally coupled with the fourth head portion 2801 of the fourth connecting panel 2424 via the second pivot pin 246. In view of the second connecting joint 2421, the second pivot pin 246 is located between the second locker hole 2426 and a second free edge 2602. In view of the fourth connecting joint 2422, the second pivot pin 246 is located between the fourth locker hole 2427 and a fourth neck portion 2802 which is a portion between the fourth head portion 2801 and the fourth base portion 2800.

After the free end portion 2441B of the second locker pin 2441 is inserted into the fourth locker hole 2427, the second locker pin 2441 is kept rotating until the second neck platform 2441C is biased against the corresponding fourth connecting panel 2424. As a result, a portion of the fourth connecting panel 2424, i.e. the fourth head portion 2801, around the fourth locker hole 2427 is pressed away from the corresponding second connecting panel 2423. Due to the pivot movement of the fourth connecting panel 2424 at the pivot point of the second pivot pin 246, an opposed portion of the fourth connecting panel 2424, i.e. the neck portion 2802, is pivotally moved to press against the corresponding second connecting panel 2423 at the second free edge 2602 thereof. Therefore, a gap between the second and fourth connecting panels 2423, 2424 will be minimized. Accordingly, when the second connecting panels 2423 and the fourth connecting panels 2424 are parallel with each other, the gap will be formed between the second and fourth connecting panels 2423, 2424 without contacting with each other. When the loading force is applied on the tabletop 10, the loading force will be concentrated at the second pivot pin 246 which may damage the second pivot pin 246 and may cause the foldable table unstable. The foldable table will be wobbly due to the gap. When the gap between the second and fourth connecting panels 2423, 2424 is minimized, the second and fourth connecting panels 2423, 2424 will press with each other to enhance the rigidity of the reinforcing frame 21 especially to reinforce the connection between the inner ends of the second and fourth elongated reinforcing members 212, 214. Furthermore, when the loading force is applied on the tabletop 10, the loading force will be evenly distributed along the second and fourth elongated reinforcing members 212, 214 via the second and fourth connecting panels 2423, 2424, such that the foldable table will be stable to prevent any unwanted wobbling movement thereof. It is worth mentioning that the neck platform is biased against the corresponding fourth connecting panel 2424 to substantially retain the gap distance between the second and fourth connecting panels 2423, 2424 so as to prevent the unwanted relative movement between the second and fourth connecting panels 2423, 2424.

It is worth mentioning that the first and second connecting joints 241, 242 are symmetrical and the first and second locker devices 243, 244 are symmetrical. Accordingly, in order to provide a pivotal movement, each of the first and second connecting joints 241, 242 has a pivotal movable gap for enabling a pivotal movement between the first and second tabletop panels 11, 12 to be pivotally folded between the folded condition and the unfolded condition. In fact, without any gap, two components, which are pivotally connected with each other, cannot be moved. Therefore, the movable gap must be inherently formed to enable the pivotal movement.

The two third connecting panels 2415 are two inner connecting panels while the first connecting panels 2413 are two outer connecting panels, wherein the third connecting panels 2415 are located and overlapped between the first connecting panels 2413. The two first connecting panels 2413 are the first connecting panel with the first locker hole and the first connecting panel without the first locker hole respectively. The two third connecting panels 2415 are the third connecting panel with the third locker hole and the third connecting panel without the third locker hole respectively. The pivotal movable gap is formed between each of the first and third connecting panels 2413, 2415. In other words, the two pivotal movable gaps will enable the pivotal movement between the first and third connecting panels 2413, 2415.

When the first and second tabletop panels 11, 12 are folded at the folded condition, the first and third locker holes 2417, 2418 are not aligned with each other. Therefore, the first free end portion 2431C of the first locker pin 2413 cannot be inserted into the third locker hole 2418. Once the first and second tabletop panels 11, 12 are moved at the unfolded condition, the first and third locker holes 2417, 2418 are aligned with each other. Therefore, the first free end portion 2431C of the first locker pin 2413 can be inserted into the third locker hole 2418 when the first thread portion 2431A of the first locker pin 2431 is driven to rotate.

Accordingly, the first locker pin 2431 is kept rotating until the first neck platform 2431C is biased against the corresponding third connecting panel 2415. The third connecting panel 2415 having the third locker hole 2418 will be pushed inwardly. As a result, the two third connecting panels 2415 will be slightly shifted to pivotally move with respect to the first pivot pin 245 and will be pushed toward the first connecting panel 2413 without the first locker hole. Due to the slightly pivotal movement of the third connecting panels 2415, the third connecting panel 2415 with the third locker hole will be pressed against the first connecting panel with the first locker hole as mentioned above i.e. the third neck portion 2702 of the third connecting panel 2415 with the third locker hole is pivotally moved to press against the corresponding first connecting panel 2413 with the first locker hole at the first free edge 2502 thereof. Therefore, the pivotal movable gap between the first connecting panel with the first locker hole and the third connecting panel 2415 with the third locker hole will be minimized. Furthermore, the third connecting panel 2415 without the third locker hole is pushed to press against the first connecting panel 2413 without the first locker hole, such that the pivotal movable gap between the third connecting panel 2415 without the third locker hole and the first connecting panel 2413 without the first locker hole will be minimized. As a result, the pivotal movable gap at the first connecting joint 241 will be minimized to prevent any unwanted lateral movement thereof which may cause the foldable table unstable.

Similarly, the two fourth connecting panels 2424 are two inner connecting panels while the second connecting panels 2423 are two outer connecting panels, wherein the fourth connecting panels 2424 are located and overlapped between the second connecting panels 2423. The two second connecting panels 2423 are the second connecting panel with the second locker hole and the second connecting panel without the second locker hole respectively. The two fourth connecting panels 2424 are the fourth connecting panel with the fourth locker hole and the fourth connecting panel without the fourth locker hole respectively. The pivotal movable gap is formed between each of the second and fourth connecting panels 2423, 2424. In other words, the two pivotal movable gaps will enable the pivotal movement between the second and fourth connecting panels 2423, 2424.

When the first and second tabletop panels 11, 12 are folded at the folded condition, the second and fourth locker holes 2426, 2427 are not aligned with each other. Therefore, the second free end portion 2441C of the second locker pin 2441 cannot be inserted into the fourth locker hole 2427. Once the first and second tabletop panels 11, 12 are moved at the unfolded condition, the second and fourth locker holes 2426, 2427 are aligned with each other. Therefore, the second free end portion 2441C of the second locker pin 2441 can be inserted into the fourth locker hole 2427 when the second thread portion 2441A of the second locker pin 2441 is driven to rotate.

Accordingly, the second locker pin 2441 is kept rotating until the second neck platform 2441C is biased against the corresponding fourth connecting panel 2424. The fourth connecting panel 2424 having the fourth locker hole will be pushed inwardly. As a result, the two fourth connecting panels 2424 will be slightly shifted to pivotally move with respect to the second pivot pin 246 and will be pushed toward the second connecting panel 2423 without the second locker hole. Due to the slightly pivotal movement of the fourth connecting panels 2424, the fourth connecting panel 2424 with the fourth locker hole will be pressed against the second connecting panel 2423 with the second locker hole as mentioned above i.e. the fourth neck portion 2802 of the fourth connecting panel 2424 with the fourth locker hole is pivotally moved to press against the corresponding second connecting panel 2423 with the second locker hole at the second free edge 2602 thereof. Therefore, the pivotal movable gap between the second connecting panel 2423 with the second locker hole and the fourth connecting panel 2424 with the fourth locker hole will be minimized. Furthermore, the fourth connecting panel 2424 without the third locker hole is pushed to press against the second connecting panel 2423 without the second locker hole, such that the pivotal movable gap between the fourth connecting panel 2424 without the fourth locker hole and the second connecting panel 2423 without the first locker hole will be minimized. As a result, the pivotal movable gap at the second connecting joint 242 will be minimized to prevent any unwanted lateral movement thereof which may cause the foldable table unstable.

Figure 2:
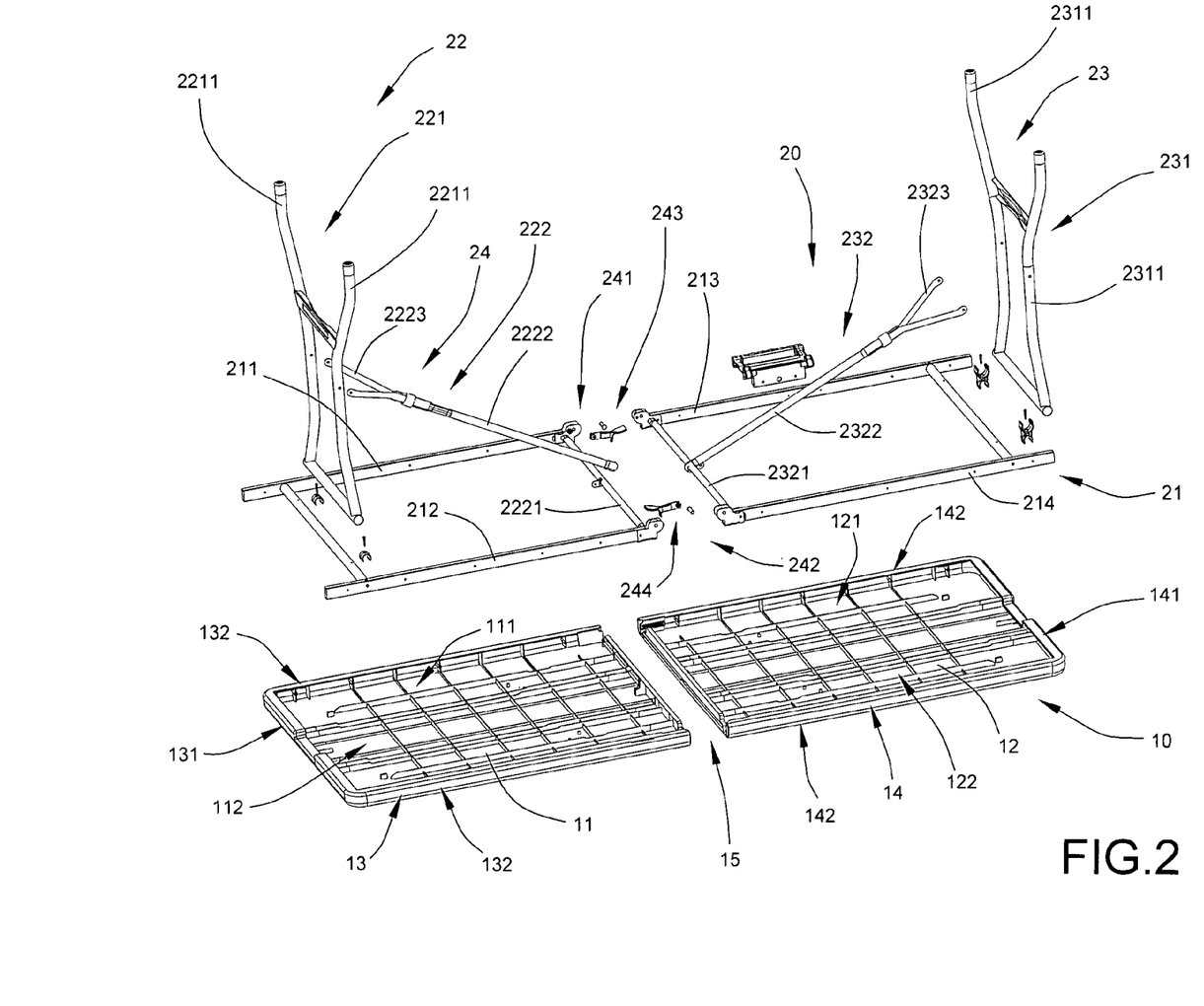
FIG. 2 is an exploded perspective view of the foldable table according to the above preferred embodiment of the present invention.
Figure 3:
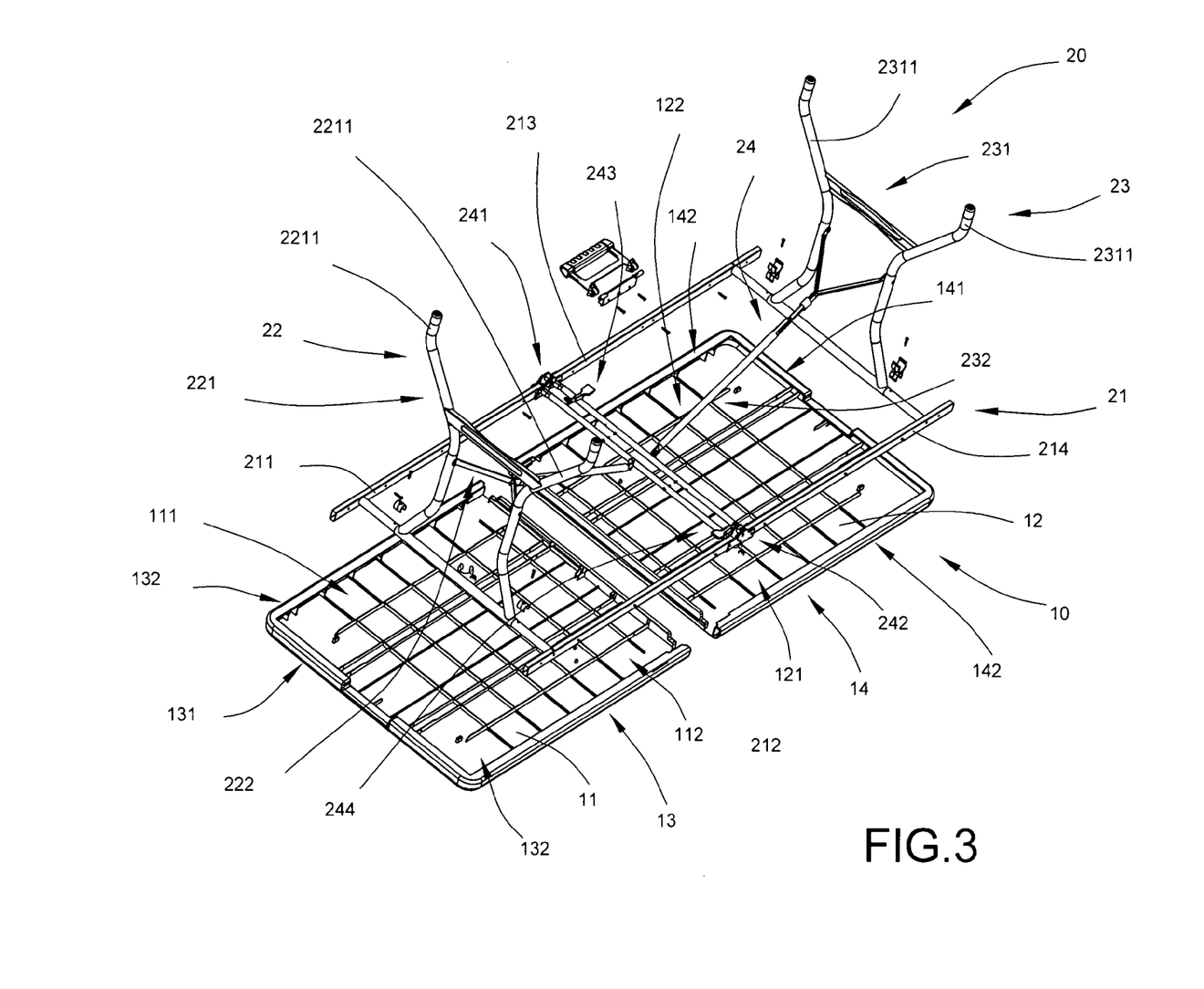
FIG. 3 is a schematic diagram of the foldable table according to the above preferred embodiment of the present invention.

Referring to FIG. 2 of the drawings, the tabletop 10 further comprises an engagement mechanism 15 provided on an inner side of the first and the second tabletop panel 11, 12 for facilitating easy folding and unfolding of the tabletop 10 while maintaining the stability thereof. More specifically, the engagement mechanism 15 comprises a first engaging member 151 and a second engaging member 152 provided on an inner side edge of the first tabletop panel 11 and the second tabletop panel 12 respectively, wherein the first engaging member 151 is arranged to be detachably engaged with the second engaging member 152.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A hinge arrangement for a foldable table which comprises first and second tabletop panels, wherein the hinge arrangement comprises:

a first connecting joint comprising first and third joint members, wherein said first joint member is pivotally connected with said third joint member for enabling a pivotal movement between said first and second tabletop panels to be pivotally folded between a folded condition and an unfolded condition; and a first locker device coupled at said first connecting joint, wherein said first locker device has a first locker hole formed at said first joint member and a third locker hole formed at said third joint member, wherein said first locker hole is aligned with said third locker hole when said first and second tabletop panels are folded at said unfolded condition, wherein said first locker device further comprises a first locker pin rotatably engaged at said first locker hole, wherein when said first locker pin is rotated to insert into said third locker hole, a pivotal movement between said first joint member and said third joint member is locked, wherein when said first locker pin is rotate to disengage with said third locker hole, said first joint member and said third joint member is adapted to be pivotally moved.

2. The hinge arrangement, as recited in claim 1, wherein said first locker hole is a thread hole, wherein said first locker pin has a first thread portion and a first free end portion arranged in such a manner that when said first thread portion of said first locker pin is rotated at said first locker hole, said first free end portion of said first locker pin is inserted into said third locker hole.

3. The hinge arrangement, as recited in claim 2, wherein a diameter of said first locker hole is larger than a diameter of said third locker hole which matches with said first free end portion of said first locker pin.

4. The hinge arrangement, as recited in claim 3, wherein a diameter of said first thread portion of said first locker pin is larger than a diameter of said first free end portion thereof to define a first neck platform between said first thread portion and said first free end portion.

5. The hinge arrangement, as recited in claim 4, wherein a length of said first thread portion of said first locker pin is longer than a length of said first locker hole, such that after said first free end portion of said first locker pin is inserted into said third locker hole, said first locker pin is kept rotating until said first neck platform thereof is biased against said third joint member.

6. The hinge arrangement, as recited in claim 5, wherein said first locker hole is aligned with said third locker hole only when said first and second tabletop panels are folded at said unfolded condition, wherein said first locker hole is misaligned with said third locker hole when said first and second tabletop panels are folded at said folded condition.

7. The hinge arrangement, as recited in claim 5, further comprising a first locker handle, wherein said first locker pin is extended from said first locker handle such that said first locker handle drives said first locker pin to rotate in order to insert into said third locker hole.

8. The hinge arrangement, as recited in claim 7, wherein said first joint member comprises two first connecting panels and said third joint member comprises two third connecting panels overlapped with said first connecting panels respectively, wherein said first locker hole is formed at one of said first connecting panels, wherein said third locker hole is formed at one of said third connecting panels which is overlapped with said first connecting panel with said first locker hole.

9. The hinge arrangement, as recited in claim 8, wherein each of said first connecting panels has a first base portion and a first head portion extended from said first base portion, wherein each of said third connecting panels has a third base portion and a third head portion extended from said third base portion, wherein a first pivot hole is formed at said first head portion of each of said first connecting panels, wherein a third pivot hole is formed at said third head portion of each of said third connecting panels, wherein a first pivot pin penetrates said first and third pivot holes such'that said first and third joint members are pivotally coupled with each other.

10. The hinge arrangement, as recited in claim 9, wherein at least a portion of said third connecting panel is pressed against said corresponding first connecting panel with respect to said first pivot pin when said first neck platform of said first locker pin is biased against said third joint member to minimize a gap between said first and second connecting panels.

11. The hinge arrangement, as recited in claim 5, wherein said first joint member comprises two first connecting panels and said third joint member comprises two third connecting panels overlapped with said first connecting panels respectively, wherein said first locker hole is formed at one of said first connecting panels, wherein said third locker hole is formed at one of said third connecting panels which is overlapped with said first connecting panel with said first locker hole.

12. The hinge arrangement, as recited in claim 11, wherein each of said first connecting panels has a first base portion and a first head portion extended from said first base portion, wherein each of said third connecting panels has a third base portion and a third head portion extended from said third base portion, wherein a first pivot hole is formed at said first head portion of each of said first connecting panels, wherein a third pivot hole is formed at said third head portion of each of said third connecting panels, wherein a first pivot pin penetrates said first and third pivot holes such that said first and third joint members are pivotally coupled with each other.

13. The hinge arrangement, as recited in claim 12, wherein at least a portion of said third connecting panel is pressed against said corresponding first connecting panel with respect to said first pivot pin when said first neck platform of said first locker pin is biased against said third joint member to minimize a gap between said first and second connecting panels.

14. The hinge arrangement, as recited in claim 3, further comprising a first locker handle, wherein said first locker pin is extended from said first locker handle such that said first locker handle drives said first locker pin to rotate in order to insert into said third locker hole.

15. The hinge arrangement, as recited in claim 2, wherein a diameter of said first thread portion of said first locker pin is larger than a diameter of said first free end portion thereof to define a first neck platform between said first thread portion and said first free end portion.

16. The hinge arrangement, as recited in claim 15, wherein a length of said first to thread portion of said first locker pin is longer than a length of said first locker hole, such that after said first free end portion of said first locker pin is inserted into said third locker hole, said first locker pin is kept rotating until said first neck platform thereof is biased against said third joint member.

17. The hinge arrangement, as recited in claim 1, wherein said first locker hole is aligned with said third locker hole only when said first and second tabletop panels are folded at said unfolded condition, wherein said first locker hole is misaligned with said third locker hole when said first and second tabletop panels are folded at said folded condition.

18. The hinge arrangement, as recited in claim 1, further comprising a first locker handle, wherein said first locker pin is extended from said first locker handle such that said first locker handle drives said first locker pin to rotate in order to insert into said third locker hole.

19. The hinge arrangement, as recited in claim 1, wherein said first joint member comprises two first connecting panels and said third joint member comprises two third connecting panels overlapped with said first connecting panels respectively, wherein said first locker hole is formed at one of said first connecting panels, wherein said third locker hole is formed at one of said third connecting panels which is overlapped with said first connecting panel with said first locker hole.

20. The hinge arrangement, as recited in claim 19, wherein each of said first connecting panels has a first base portion and a first head portion extended from said first base portion, wherein each of said third connecting panels has a third base portion and a third head portion extended from said third base portion, wherein a first pivot hole is formed at said first head portion of each of said first connecting panels, wherein a third pivot hole is formed at said third head portion of each of said third connecting panels, wherein a first pivot pin penetrates said first and third pivot holes such that said first and third joint members are pivotally coupled with each other.

* * * * *